United States Patent [19]

Allemand et al.

[11] Patent Number: 4,469,947

[45] Date of Patent: Sep. 4, 1984

[54] X-RAY DETECTOR WITH COMPENSATING SECONDARY CHAMBER

[75] Inventors: Robert Allemand, Saint Ismier; Jean-Jacques Gagelin, Vinay; Edmond Tournier, Grenoble, all of France

[73] Assignee: Commissariat a l'Energie Atomique, Paris, France

[21] Appl. No.: 365,081

[22] Filed: Apr. 2, 1982

[30] Foreign Application Priority Data

Apr. 15, 1981 [FR] France ............................... 81 07568

[51] Int. Cl.[3] ............................................... G01T 1/18

[52] U.S. Cl. .................................................. 250/385

[58] Field of Search .................... 250/385, 374; 378/7, 378/19

[56] References Cited

U.S. PATENT DOCUMENTS

| | | | |
|---|---|---|---|
| 3,812,362 | 5/1974 | Larsen et al. | 250/385 |
| 3,937,965 | 2/1976 | Vasseur | 378/7 |
| 4,031,396 | 6/1977 | Whetten et al. | 250/385 |
| 4,047,041 | 9/1977 | Houston . | |
| 4,149,080 | 4/1979 | Schittenhelm | 378/7 |
| 4,213,046 | 7/1980 | Beyersdorf | 250/385 |
| 4,367,409 | 1/1983 | Klausz | 250/385 |

FOREIGN PATENT DOCUMENTS 1598962 3/1978 United Kingdom .

*Primary Examiner*—Janice A. Howell
*Attorney, Agent, or Firm*—Pearne, Gordon, Sessions, McCoy, Granger & Tilberry

[57] ABSTRACT

The present invention relates to an X-ray detector adapted to detect rays having passed through an object or an organ. This detector comprises at least one main tight chamber containing a gas ionizable by X-ray and, in this chamber, a plate for collecting the charges resulting from ionization of the gas. It comprises a secondary ionization chamber, coupled to the main chamber to compensate the scattering current.

8 Claims, 4 Drawing Figures

X-RAY DETECTOR WITH COMPENSATING SECONDARY CHAMBER

Figure 1:
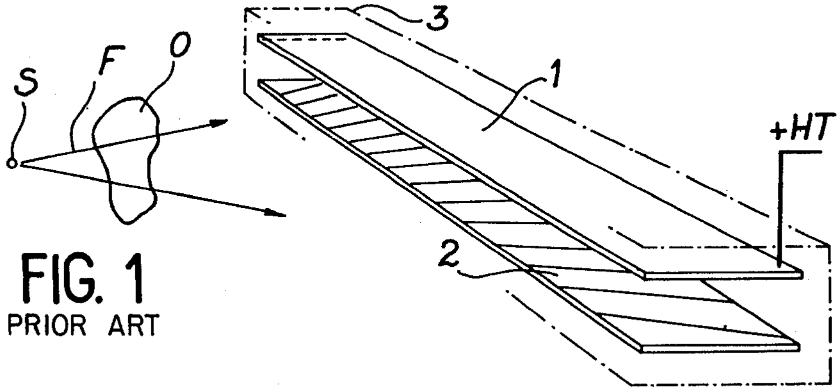
FIG. 1 PRIOR ART

The present invention relates to an X-ray detector, and particularly one for detecting X-rays which have passed through an object and/or an organ, which may be a part of a plant or animal body, or an inanimate object, which X-rays were furnished by a specific source emitting in the direction of the object or organ a plane beam of incident X rays having a wide angular aperture and of small thickness. This invention is more particularly applicable to the tomography of organs, but also to industrial checking, such as the checking of luggage, for example.

These X-ray detectors make it possible to measure the absorption of a beam of X-rays passing through an object or an organ, this absorption being associated with the density of the tissues of the organ examined or the density of the materials constituting the object studied.

If it is desired to draw up the density chart of an organ or an object, it is possible, and known, to send a plane beam of incident X rays onto this object or organ, said beam having a wide angular aperture and being of small thickness, and to observe the corresponding absorption for each position of the beams of incident X-rays with respect to the object or organ. A multiplicity of scannings in crossing directions makes it possible to know, due to the X-ray detector, after an appropriate digital processing of the signals collected on the cells of the detector, the value of the absorption of the X-rays at one point of the plane of section considered, and thus to know the density of the tissue of the organ or the density of the materials constituting the object.

Most of the X-ray detectors employing ionization and used in tomography are of multicellular type and comprise cells defined by conducting plates perpendicular to the plane of the beam of X-rays and taken alternately to positive and negative potentials. These cells are located in a tight enclosure containing an ionizable gas. The advantages of this type of multi-cellular detector are as follows: they allow a good collimation of the X-rays when the plates used in the detection cells are constituted by a very absorbent material; the time for collection of the charges resulting from ionization of the gas by the X-rays is very short due to the small spacing of the conducting plates and the good separation between the detection cells. However, this type of detector presents considerable drawbacks: it is possible to reduce the thickness of the plates in order to increase the quantity of X-rays detected, but this is to the detriment of collimation due to the small thickness of the plates: this small thickness of the plates further provokes a considerable microphony. Finally, the detectors of this type are highly complex to produce, this leading to high manufacturing costs, and they necessitate assembly in a dedusted room, since any dust on one of the plates may start off or deteriorate the leakage current between two consecutive plates. Added to these drawbacks is the fact that the numerous plates used require numerous electrical connections inside the tight chamber, which raises difficult problems of reliability of the welds of the connections on the plates.

Another type of detector is known which has a much simpler structure, but which is not perfect. This other type of detector comprises a tight chamber containing a gas ionizable by rays issuing from the organ or the object and, in this chamber, a plate for collecting the electrons resulting from ionization of the gas; this plate is parallel to the plane of the beam of incident rays and it is taken to a positive high voltage. A series of electrodes for collecting the ions resulting from ionization of the gas by the X-rays issuing from the object, is disposed parallel and opposite the preceding plate; these ion collecting electrodes are taken to a potential close to 0 and are directed towards the source which emits the X-rays in the direction of the object. Each ion collecting electrode defines an elementary cell of the detector. These electrodes are located in a plane parallel to the plane of the beam of the incident rays and furnish respectively a current which is the sum, on the one hand, of a measuring current proportional to the quantity of ions obtained by ionization of the gas opposite each electrode, under the effect of the rays issuing from the object or the organ, in a direction corresponding to that of the incident rays, and, on the other hand, of a scattering current coming from the rays diffused by the object or by the organ, or, in general, by all obstacles encountered by the incident rays, in other directions than that of the incident rays.

This type of detector presents certain advantages: there are no longer any separation plates, as in the detector mentioned hereinbefore; this eliminates any undesirable phenomenon of microphony. Due to the elimination of the separation plates, the quality of X-rays detected is maximum; this type of detector is very simple to produce and it is hardly sensitive to dust. However, this type of detector presents a serious drawback which results from the fact that the current collected on each of the electrodes taken to a potential close to 0, comprises a parasitic current which falsifies measurements; this current is a scattering current coming from the rays diffused in directions other than that of the incident rays.

It is an object of the present invention to overcome these drawbacks and in particular to produce an X-ray detector which makes it possible to eliminate, from the current collected on each of the electrodes which are taken to a potential close to 0, the parasitic current resulting from the rays diffused particularly by the object or by the organ, in directions other than that of the incident rays.

The invention relates to an X-ray detector adapted for example to detect rays having passed through an object or an organ and being furnished by a source emitting towards the object or organ a plane beam of incident X-rays, this beam having a wide angular aperture and being of small thickness, said detector comprising at least one main tight ionization chamber containing at least one gas ionizable by the X-rays and, in this chamber, a plate for collecting the charges resulting from ionization of the gas, this plate being parallel to the plane of the beam of incident rays and being taken to a first potential and a series of flat electrodes for collecting the charges resulting from ionization of the gas, these electrodes being taken to a second potential and being directed towards the source, in a plane parallel to the plane of the beam of incident rays opposite the charge collecting plate, these electrodes each defining an elementary detection cell and respectively furnishing a current which is the sum on the one hand of a measuring current proportional to the quantity of charges obtained by the ionization of the gas opposite each electrode under the effect of the rays issuing from the object, in directions corresponding to those of the incident rays and, on the other hand, of a scattering current resulting from the ionization of the gas by diffused rays, in directions other than those of the incident rays, is characterised in that it comprises a secondary ionization chamber coupled to the main chamber to compensate the scattering current.

According to another feature of the invention, the charge collecting electrodes of the main ionization chamber are supported by one of the faces of an electrically insulating plate, the charge collecting plate of said main ionization chamber being taken to a second determined potential, the secondary ionization chamber containing the same ionizable gas as the main ionization chamber and comprising a series of charge collecting electrodes borne by the other face of the electrically insulating plate, these electrodes being respectively connected to the electrodes of the main ionization chamber and being taken to the same second potential close to zero, the secondary ionization chamber further comprising a charge collecting plate parallel to the electrically insulating plate, located opposite the electron collecting electrodes and taken to a third potential of sign opposite the first potential, the ionization of the gas in this secondary ionization chamber being produced by the X-rays diffused by the object.

According to another feature, the charge collecting plate of the main chamber and the charge collecting plate of the secondary chamber are identical, the charge collecting electrodes of the main chamber being respectively identical to the charge collecting electrodes of the secondary chamber.

According to another feature, the electrically insulating plate supporting the series of electrodes of the main and secondary chambers, is located half way between the charge collecting plate of the main chamber and the charge collecting plate of the secondary chamber.

According to another feature, the charge collecting electrodes of the main chamber are respectively located opposite the charge collecting electrodes of the secondary chamber.

According to a further feature, the first and third potentials have the same absolute value.

According to another feature, the ionizable gas is xenon.

According to a further feature, the ion and electron collecting electrodes of the main and secondary chambers are constituted by a deposit of copper on an insulating support.

The invention will be more readily understood on reading the following description with reference to the accompanying drawings, in which:

FIG. 1 schematically shows, in perspective, a detector of known type comprising a plate taken to a positive potential and, opposite, a series of electrodes taken to a potential close to 0.

Figure 2:
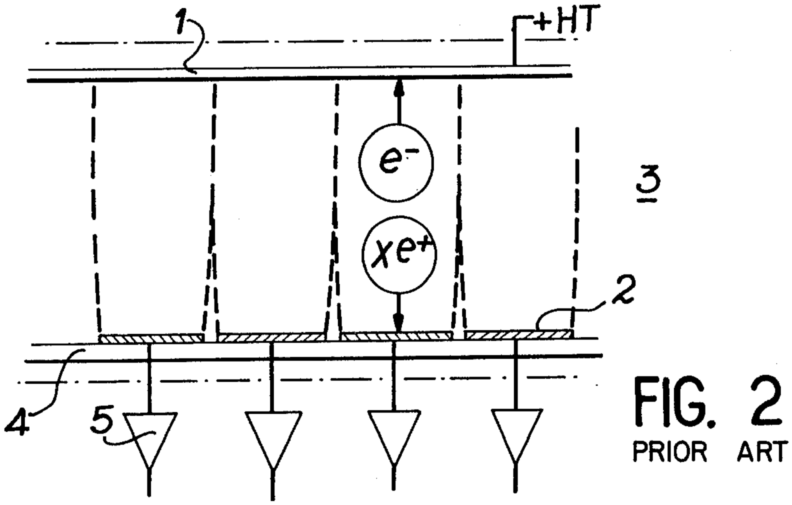
FIG. 2 PRIOR ART

FIG. 2 schematically shows a front view of the detector of FIG. 1.

Figure 3:
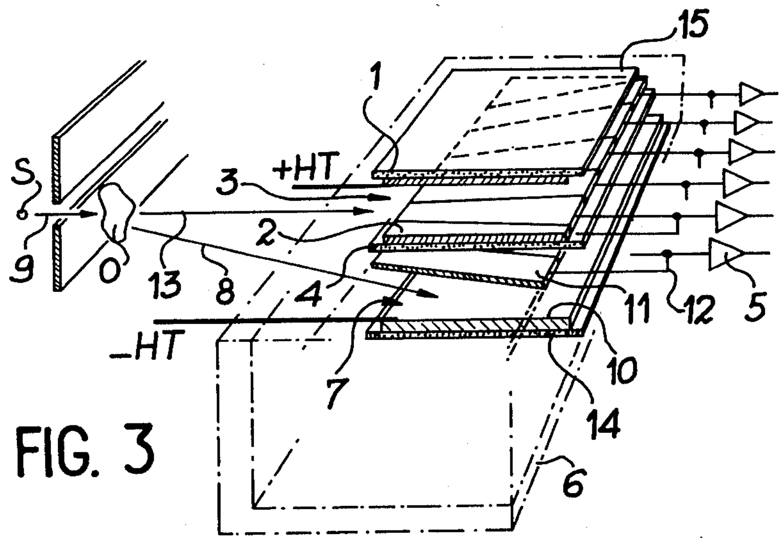

FIG. 3 schematically shows, in perspective, a detector according to the invention.

Figure 4:
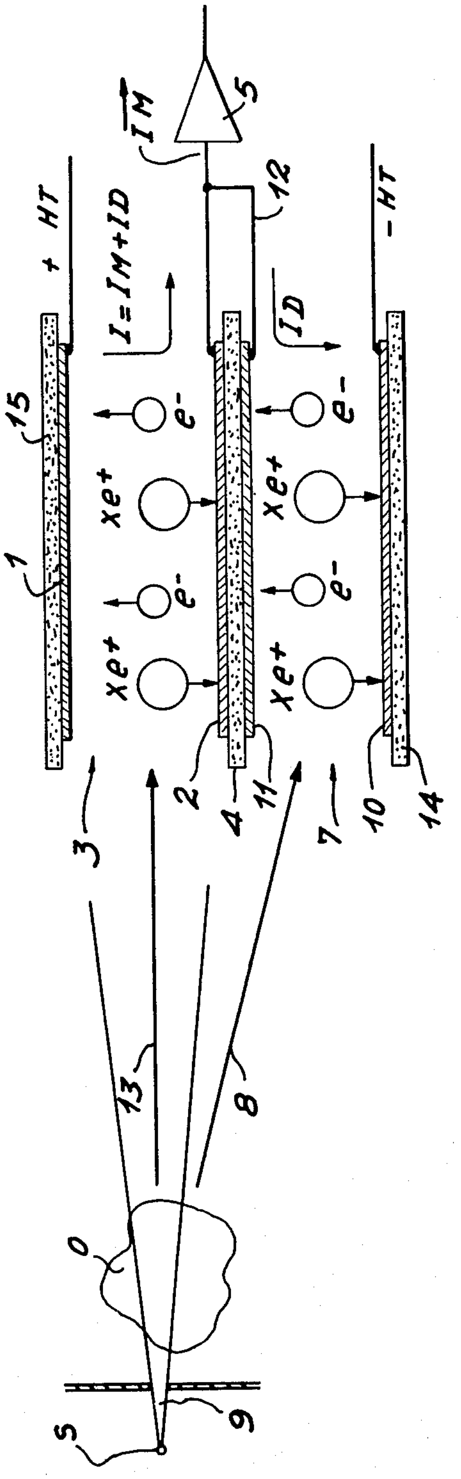

FIG. 4 schematically shows a side view of the detector of the invention.

Referring now to the drawings, FIG. 1 schematically shows, in perspective, a detector of known type comprising a plate 1 taken to a positive high voltage +HT and, opposite, a series of electrodes 2 taken to a potential close to 0 volt. This plate and these electrodes are located in a main tight chamber 3, shown schematically, which contains at least one ionizable gas, such as xenon for example. This detector makes it possible to detect the X-rays which have passed through an object or an organ 0, these rays being furnished by a specific source S which emits, in the direction of the object or the organ, a plane beam F of incident X-rays; this beam has a wide angular aperture and is of small thickness. The plate 1 is parallel to the plane of the beam of incident rays, whilst the flat electrodes 2 are located in a plane parallel to the plane of the beam of incident rays, opposite the plate 1. The plate 1 which is taken to a positive potential of some kilovolts, is an electron collecting plate, whilst the electrodes 2 are ion collecting electrodes. These electrodes are generally supported by an insulating plate (not shown in this Figure) and are electrically insulated from each other. The pressure of the xenon inside the tight chamber has a value of between 10 and 20 bars; this gas may, moreover, be supplemented by other electropositive gases intended to improve detection. The electrodes 2 form bands converging in the direction of the source S.

The chamber 3 functions as follows:

When a photon X arrives in this chamber 3 containing a gas, it will interact with one or more molecules of this gas.

If the energy (Ex) of this photon X is greater than the ionization energy of the gas (21.6 eV for the xenon), it will ionize the molecules of gas on its path: for example Ex=80 keV in the Xe, N=80 000/21.6, N=3700 number of molecules of xenon ionized.

There is therefore creation of 3700 $Xe^+$ and of 3700 $e^-$.

In the absence of an electrical field, the preceding particles recombine. However, when the high voltage is applied, under the effect of the electrical field, these charged particles separate:

- the electrons $e^-$ are directed towards the plate 1 at high voltage +HT,
- the ions $Xe^+$ move towards the measuring electrode 2(at 0 V).

It is the displacement of a nearby charged particle which induces in the measuring electrode 2 (and also in the high voltage electrode 1) a current $I_M$ which may be amplified and measured. This current is therefore proportional to the number of particles created and consequently to the energy Ex of the incident photon X.

It may also be noted that the addition of an electronegative gas in the chamber 3 disturbs only the charge collecting time, to the exclusion of their number, as:

- the ions $Xe^+$ move towards the measuring electrode 2, but are slowed down by the molecules of electronegative gases moving in opposite direction,
- the few electrons which remain free move very rapidly (as in the pure gas, about 1000 times faster than the ions $Xe^+$)towards the electrode 1 at positive high voltage,
- the electrons picked up by the electronegative molecules take these molecules towards the high voltage electrode 1 at a speed of the same order of size as that of the ions $Xe^+$.

FIG. 2 schematically shows a front view of the preceding detector. This Figure shows the plate 1 taken to a positive potential +HT as well as the electrodes 2 taken to a potential close to 0 volt; these electrodes are supported by an electrically insulating plate 4 and each of them is connected to an amplifier 5 which makes it possible to sample the current circulating in each of the electrodes; these currents are applied to a processing and display system (not shown) which displays the body or object O traversed by the X-rays emitted by the source S. In this Figure, the vertical broken lines represent the lines of field, and the horizontal broken lines represent the equipotentials of the electric field created by the potential difference between the positive plate 1 and the electrodes 2 taken to a potential close to 0. In the chamber 3 containing at least xenon, $Xe^+$ represents the positive ions of xenon which are directed towards the electrodes 2 and $e^-$ the electrons which are directed towards the plate 1, these ions and electrons resulting from ionization of the xenon by the X-rays issuing from the object or the organ O.

FIG. 3 schematically shows, in perspective, a detector according to the invention. This detector comprises a tight chamber 6 containing at least one ionizable gas such as xenon for example; this chamber is subdivided into two ionization chambers: a main ionization chamber 3 and a secondary ionization chamber 7. The main ionization chamber 3 contains, like the detector of known type of FIG. 1, a plate 1 taken to a positive high voltage +HT and a series of electrodes 2 taken to a potential close to 0 volt; as before, these electrodes are flat and are supported by an electrically insulating plate 4; the plate 1 as well as the electrodes 2 are located in a plane parallel to the plane of the beam of X-rays issuing from the object O (this beam not being shown completely in the Figure). The electrodes 2 converge in the direction of the source S. Each of the electrodes 2 of the main ionization chamber 3 is connected to an amplifier 5 which makes it possible to sample, with a view to processing, the current circulating in each of these electrodes. According to the invention, the secondary ionization chamber 7 located outside the beam of X-rays, is coupled to the main chamber to compensate the scattering current coming from the X-rays diffused by the organ O. In fact, as is seen hereinafter in detail, the electrodes 2 of the main ionization chamber 3 respectively furnish a current which is the sum, on the one hand, of a measuring current proportional to the quantity of ions obtained by ionization of the gas opposite each electrode of the main ionization chamber, under the effect of the rays issuing from the objects, in directions corresponding to that of the incident rays 9, and of a scattering current resulting from ionization of the gas by the rays 8 diffused by the object, in directions other than that of the incident rays. The secondary ionization chamber 7 contains, like the main ionization chamber, a plate 10 parallel to the plane of the beam of incident X-rays, which is taken to a negative high voltage −HT, as well as a series of flat electrodes 11 parallel to the plane of the beam of incident X-rays, located on another face of the insulating plate 4 which supports the electrodes 2 of the main ionization chamber 3. These electrodes 11 are taken, like the electrodes 2 of the main ionization chamber, to a potential close to 0. They are respectively connected by leads 12 to the corresponding electrodes of the main ionization chamber 3. The electrodes 11 of the secondary ionization chamber and the electrodes 2 of the main ionization chamber are preferably identical and located opposite one another. The secondary ionization chamber 7 makes it possible, as will be seen hereinafter in detail, to compensate, for subsequent processing of the currents issuing from the amplifiers 5, the parasitic currents which circulate in each electrode of the main ionization chamber and which come from the X-rays diffused by the object or the organ O. The electrodes 11 of the secondary ionization chamber 7 are electrodes for collecting the electrons $e^-$, whilst the plate 10 is a plate for collecting the ions $Xe^+$ coming from ionization of the xenon contained in the secondary chamber 7, by the X-rays diffused by the object or the organ O. The electrodes of the secondary ionizaion chamber are preferably located opposite the electrodes of the main ionization chamber and the positive and negative high voltages have the same absolute value.

FIG. 4 schematically shows a side view of the detector of the invention. This view shows the specific source S, the object or the organ 0, one of the rays 9 emitted by the source S and, leaving the object O, the direct ray 13 issuing from the object O, in the same direction as the incident ray 9; this Figure also shows one of the diffused rays 8, issuing from the object 0, in a direction different from the direction of the incident ray 9. The Figure shows one of the electrodes 2 of the main ionization chamber which is connected to an amplifier 5 and which is taken to a potential close to 0 and one of the electrodes 11 of the secondary ionization chamber 7, which is located opposite the electrode 2 and which is separated from this electrode by the insulating plate 4. The lead 12 between the electrodes of the main and secondary ionization chamber has also been shown. Finally, the plates 1 and 10 of the main and secondary ionization chambers, taken respectively to positive and negative potentials +HT and −HT have been shown. In this Figure, the tight chamber 6 which contains the ionizable gas has not been shown in detail; the insulating plates 15, 14 support the conducting plates 1, 10 of the main and secondary ionization chambers. When the ionizable gas is for example xenon, the X-rays shown at 13 and which issue from the object, in the direction of the incident rays 9, arrive between the electrodes 2 and the plate 1 of the main ionization chamber; ionization of the xenon is then produced between these electrodes and this plate. This ionization is schematically represented in this Figure by ions $Xe^+$ which are attracted by the electrodes 2, and by electrons $e^-$ which are attracted by the positive plate 1. Ionization is thus produced opposite each of the electrodes of the main ionization chamber due to the X-rays issuing from the object, in the direction of the incident rays. These movements of ions produce respectively in each electrode a current I which is the sum of a current $I_M$ resulting from ionization of the gas opposite each of the electrodes, under the effect of the X-rays issuing from the object (rays shown at 13 in the Figure) in a direction corresponding to that of the incident rays, and of a so-called scattering current $I_D$ which results from ionization of the gas, opposite each of the electrodes, from the rays diffused by the object (shown at 8 in the Figure) or by any material obstacle encountered by the incident X-rays, in directions which do not correspond to those of the incident X-rays. The ionization chamber 7 makes it possible to compensate this "scattering current", due to the ionization produced in this chamber by the diffused X-rays 8; this ionization provokes the circulation, in the electrodes 11 of the secondary chamber, of a current $I_D$ which, due to the lead 12, cancels out the parasitic "scattering current" taken into account by the electrodes of the main ionization chamber. In fact, study has demonstrated that the current collected in the secondary ionization chamber was representative of the scattering current collected in the main ionization chamber. Thus, the amplifiers 5 connected to each of the electrodes of the main and secondary ionization chambers, receive a current $I_M$ which is effectively the measuring current corresponding to the ionization of the gas, provoked opposite each of the electrodes of the main ionization chamber by the rays 13 issuing from the object or the organ in the directions which correspond to those of the incident rays 9.

The plates and electrodes of the main and secondary ionization chambers are preferably produced in the form of a deposit of copper on an insulating support.

By way of indication, the number of cells of each chamber may be greater than 500, for an angle of aperture of the beam of X-rays greater than 40°; in this case, the pitch between each of the electrodes of each chamber is about 1 mm. The insulating plate 4 which supports the electrodes of the main and secondary chambers is located half way between these plates 1 and 10, respectively taken to positive and negative potential. The distance between these plates 1 and 10 is about 14 mm and the ion collecting time is about 10 ms.

It is obvious that, in the detector which has just been escribed, the means used could have been replaced by equivalent means, without departing from the scope of the invention.

What is claimed is:

1. An X-ray detector for detecting rays having passed through an object and being furnished by a source emitting towards the object a plane beam of incident X-rays, said beam having a wide angular aperture and being of small thickness, said detector comprising at least one main ionization chamber containing at least one gas ionizable by the said beam and, in this chamber, a plate for collecting the charges resulting from ionization of the gas, this plate being parallel to the plane of the beam of incident rays and being taken to a first potential, and a series of flat electrodes for collecting the charges resulting from ionization of the gas, these electrodes being taken to a second potential and being directed towards the source, in a plane parallel to the plane of the beam of incident rays opposite the charge collecting plate, these electrodes each defining an elementary detection cell and respectively furnishing a current which is the sum on the one hand of a measuring current proportional to the quantity of charges obtained by the ionization of the gas opposite each electrode under the effect of the X-rays passing through the object, in directions corresponding to those of the incident rays and, on the other hand, of a scattering current resulting from ionization of the gas by rays diffused in directions other than those of the incident rays, wherein said X-ray detector comprises a secondary ionization chamber coupled to said main chamber to compensate the scattering current, and wherein said secondary ionization chamber contains the same ionizable gas as said main ionization chamber and comprising a series of charge collecting electrodes mounted parallel to and respectively connected to said electrodes of said main ionization chamber and being taken to the same second potential close to zero, and secondary ionization chamber further comprising a charge collecting plate substantially parallel to the first-mentioned charge collecting plate located opposite said charge collecting electrodes of said secondary chamber and taken to a third potential, of sign opposite the first potential, the ionization of the gas in said secondary ionization chamber being produced by the X-rays diffused by the object.

2. The detector of claim 1, wherein said charge collecting electrodes of said main and secondary ionization chambers are supported by opposite faces of an electrically insulating plate.

3. The detector of claim 2, wherein said charge collecting plate of said main chamber and said charge collecting plate of said secondary chamber are identical, said charge collecting electrodes of said main chamber being respectively identical to said charge collecting electrodes of said secondary chamber.

4. The detector of claim 3, wherein said electrically insulating plate supporting the series of electrodes of said main and secondary chambers is located half way between said charge collecting plate of said main chamber and said charge collecting plate of said secondary chamber.

5. The detector of claim 4, wherein said charge collecting electrodes of said main chamber are respectively located opposite said charge collecting electrodes of said secondary chamber.

6. The detector of claim 4, wherein the first potential and the third potential have the same absolute value.

7. The detector of any one of claims 1 to 6, wherein said ionizable gas is xenon.

8. The detector of any one of claims 2 to 6, wherein said charge collecting plates and electrodes of said main and secondary chambers are constituted by a deposit of copper on an insulating support.

* * * * *